United States Patent Office 2,784,064
Patented Mar. 5, 1957

2,784,064
INDICATOR FOR CHLORIDE TITRATIONS

Frank E. Clarke, West Annapolis, Md.

No Drawing. Application July 20, 1955,
Serial No. 523,392

19 Claims. (Cl. 23—230)

(Granted under Title 35, U. S. Code (1952), sec. 266)

The invention described herein may be manufactured and used by or for the Government of the United States of America for governmental purposes without the payment of any royalties thereon or therefor.

This invention relates to a chemical indicator utilizable in and a method for the quantitative determination of the chloride ion in water and aqueous solutions generally.

This application is a continuation-in-part of application Serial No. 155,774, filed April 13, 1950, now abandoned.

There are known and used several methods for measuring the chloride ion in solutions, the most important of which may be mentioned as follows: (a) the Mohr method involving the titration of a neutral chloride solution with silver nitrate solution, using potassium chromate solution as an end point indicator; (b) the precipitation of chloride as silver chloride with silver nitrate and weighing the precipitate; (c) the addition of silver nitrate solution to a nitric acid acidified solution of the chloride and comparison of the turbidity formed with standard turbidities developed in the same manner; and (d) the Volhard method of adding excess silver nitrate to acidified chloride solution and titrating the silver in excess of the silver-chloride equivalence point with thiosulphate solution.

These methods, while useful, have certain disadvantages. For example, in the Mohr (a) method the silver nitrate-potassium chromate titration is based on a subtle change of solution color from yellow to orange red at the silver-chloride equivalence point. This change occurs gradually and the true end point cannot be detected readily in solutions containing low concentrations of chloride (20 parts per million or less). Even in higher concentrations, satisfactory titrations can be made only by a highly skilled technologist.

In the (b) method, the gravimetric determination of chloride as silver chloride is extremely slow and involves many analytical manipulations, such as filtering and weighing, and is not practicable for low concentrations of chlorine (20 parts per million or less).

The (c) method is restricted to clear uncolored waters and to chloride concentrations below ten parts per million. It is cumbersome and the results are somewhat ambiguous because they depend on matching of turbidities rather than true colors.

The Volhard titration (d) is restricted by the fact that it does not have a sharp end point. This is because silver thiocyanate gradually reacts with silver chloride after all of the free silver ions have reacted with the thiocyanate ions.

In addition to those mentioned, two additional methods have been proposed, the one involving the titration of a nitric acid acidified solution of chloride with mercuric nitrate solution using either diphenylcarbazide or diphenylcarbazone indicator; and the other involving titration of a nitric acid acidified solution of chloride with mercuric nitrate, using bromophenol blue as a pH indicator and diphenylcarbazide as the end point indicator.

These latter proposals have inherent deficiencies in that titrations according to the first proposal suffer from the deficiency of premature development of end point color, and in addition the titrations with diphenylcarbazide indicator have the added deficiencies of instability of end point indicator and low contrast of the fully developed end point color. Titrations according to the second proposal have deficiencies of instability of end point indicator and low contrast of end point color particularly in the low chloride concentrations. In addition the use of a separate pH indicator is a disadvantage, particularly in field work, and this disadvantage is accentuated by the fact that the color change point of the pH indicator occurs at approximately pH 3.5 while the optimum pH for the diphenylcarbazide titration is approximately 2,0.

The general and primary object of my invention is to overcome the deficiencies of the prior methods and proposals in a simple and satisfactory titration procedure.

Additionally, objects of the invention include a method of chloride ion determination which has extreme sensitivity with sharp and pronounced discernability; which has pronounced accuracy; which operates with a high degree of speed and lack of complication; and which is generally indifferent to interference of other type ions and to turbidity and color.

An object of outstanding importance also is the provision of an indicator which combines in one single stable solution both a potentially sensitive and discernible end point indicator and a pH indicator, capable at the same time of facilitating simultaneously the adjustment of the optimum pH for the titration and of providing an effective background color for detection of the end point.

A preferred form of indicator in accordance with the invention consists of pure diphenylcarbazone

($C_6H_5NNCONHNHC_6H_5$)

and pure crystalline tetrabromo phenol sulphonphthalein ($C_{19}H_{10}Br_4O_5S$) (bromo phenol blue) dissolved in alcohol, preferably methyl or ethyl alcohol. Preferably also an optimum concentration is used containing 0.5 gram to 1.0 gram by weight of the diphenylcarbazone and 0.05 gram to 0.10 gram of the bromo phenol blue in solution in sufficient 95% pure ethyl alcohol or pure methyl alcohol to make 100 milliliters of solution. This means that the aliphatic alcoholic solution contains a solute having diphenylcarbazone in a preferred range of 83–95% and bromo phenol blue in a preferred range of 4.8–17% by weight of solute. (Computations to two significant figures.) A proficient indicator is obtained with .5 gram diphenylcarbazone and .05 gram bromo phenol blue.

While the concentration mentioned is desirable, it may be varied to meet special requirements to the limit of solubility of both ingredients, that is, about 2 grams of diphenylcarbazone and about 0.5 gram bromo phenol blue per 100 milliliters of alcoholic solution. Considered with the previously stated weights of 0.5 gram of diphenylcarbazone and .05 gram of bromo phenol blue, this means that the solute approximately has diphenylcarbazone in a range of 50–98% and bromo phenol blue in a range of 2.4–50% by weight. However, obviously such change from the preferred ranges of concentration would affect the discernibility and accuracy of the indicator and possibly require correction by change in the quantity of indicator used in the titration.

The two ingredients of the alcohol solution, namely, diphenylcarbazone and bromo phenol blue, constitute the indicator unit for the quantitative determination of the chloride ion in a given aqueous solution. However, the indicator can consist of the diphenylcarbazone and bromo phenyl blue in alcoholic solution. The solution is red. The diphenylcarbazone functions as an end color determinant and the bromo phenol blue both as a pH indicator and to mask the premature development of end color by the diphenylcarbazone.

In use as, for example, in the titration of chloride ion with a mercuric nitrate reagent, five drops of the red indicator fluid are added to a sample (generally 25–100 milliliters) of the solution to be tested. The pH of the solution is then adjusted with nitric acid, or with an alkali followed by the acid, to just obtain the yellow acid color of the bromo phenol blue component, and a slight excess of nitric acid (1 ml. of 0.05 N nitric acid per 100 ml. of sample solution) is then added. Mercuric nitrate solution (generally 0.025 N to 0.1 N) is now added, dropwise, until the yellow color of the solution changes to blue-violet at the mercury-chloride equivalence point, thus completing the determination.

The highly important and useful characteristics of the indicator unit as above described may now be delineated.

It is noted that from experimental data available, the optimum pH for the diphenylcarbazone indication of the chloride reaction is approximately 3.3. Since the color change point of the bromo phenol blue constituent is pH 3.5 to 3.6, it is apparent that acceptable accuracy is obtainable by the simple procedure of adding nitric acid slightly in excess of this color change point and then proceeding with the mercuric nitrate-chloride titration. The purpose of the nitric acid addition is to insure highest accuracy by establishing approximately the optimum pH value of 3.3.

The diphenylcarbazone alone would develop a creeping end point. By adding the bromo phenol blue, not only is the pH value indicated, but the premature end point is masked so that the change from pale yellow (acid) to intense blue-violet occurs in the sensitive range of one drop of 0.025 normal mercuric nitrate solution. By this means marked contrast and discernibility are secured and hence accurate detection of the mercury-chloride equivalence point is made possible.

The sensitivity and versatility of the indicator is outstanding, chloride concentrations from a fraction of a part per million to thousands of parts per million being accurately indicated. Further, because the indicator mixture contains indicators for both adjustment of pH and detection of end point, it allows simpler and faster determination of chloride than has heretofore been possible, with the possible exception of the straight mercuric nitrate-diphenylcarbazide and mercuric nitrate-diphenylcarbazone-titrations. These latter titrations, however, as previously indicated are not reliable.

A further advantage of the indicator is its availability for useful performance with all ions apt to be encountered in water and solutions with the exceptions of chromate and ferric. However, both of these last mentioned ions may be eliminated. The indicator also, because of its contrasting end point color, functions well in turbid and highly colored solutions, and even in blue solutions.

A further important characteristic of the indicator is that it possesses a high degree of stability. Shelf tests of as much as six months have produced no effects on the indicating capability of the indicator.

Tests have shown that usable modifications of the titration procedure may be made. For example, instead of using a mixture or a solution of the ingredients, the indicator elements may be added separately to the test solution. Further, the sodium salt of bromo phenol blue in water solution might be substituted for bromo phenol blue in alcohol solution. In the former case, i. e., separate additions of the indicator components, either component can be added first or both added simultaneously. The indicator unit can also be used with other aliphatic alcohols, for example propyl, butyl, amyl and hexyl, these specific alcohols containing up to six carbon atoms. However, the indicator ingredients do not have as high maximum solubilities in the higher alcohols, the maximum solubility of the diphenylcarbazone and bromo phenol blue being about 1.5 grams and .2 gram, respectively, in these alcohols. Similarly, the lower ranges of the indicator ingredients can be somewhat less than that stated hereinbefore.

Modification may also be made by substituting for the bromo phenol blue a compatible soluble dye, such as a mixture of Pontamine Fast Blue 4GL and Pontacyl Light Yellow 3G for increasing the discernibility of the diphenylcarbazone end point. The Rowe Color Index and Supplement lists the former dye under Color Index Number 533, and lists the latter under Color Index Number 636. This publication is put out by the Society of Dyers and Colorists, Bradford, Yorkshire, England; the index being dated 1924 and the supplement 1928. Since this dye serves only to produce background or masking effect, it would be necessary to employ electronic pH measurements. The drawback here is that all the dyes that improve the sharpness of the diphenylcarbazone end point reduce the accuracy of the titration and further add to the complexity and cost of the procedure by requiring use of expensive and cumbersome electronic pH apparatus.

Obviously many modifications and variations of the present invention are possible in the light of the above teachings. It is therefore to be understood that within the scope of the appended claims the invention may be practiced otherwise than as specifically described.

What is claimed is:

1. An indicator characterized by the ability to indicate both the optimum pH and the mercury-chloride equivalence point in the titration of an aqueous chloride solution with mercuric nitrate, comprising diphenylcarbazone in a range of 50–98% and bromo phenol blue in a range of 2.4–50%, by weight.

2. An indicator characterized by the ability to indicate both the optimum pH and the mercury-chloride equivalence point in the titration of an aqueous chloride solution with mercuric nitrate, comprising diphenylcarbazone in a range of 83–95% and bromo phenol blue in a range of 4.8–17%, by weight.

3. An indicating solution for titration indication of chloride in aqueous solution, consisting essentially of a lower aliphatic alcohol containing from one to six carbon atoms, including as a solute 50–98% diphenylcarbazone and 2.4–50% bromo phenol blue, by weight of solute.

4. An indicating solution for titration indication of chloride in aqueous solution, consisting essentially of a lower aliphatic alcohol containing from one to six carbon atoms, including as a solute 83–95% diphenylcarbazone and 4.8–17% bromo phenol blue, by weight of solute.

5. An indicating solution as defined in claim 3 but characterized by said aliphatic alcohol being chosen from the class consisting of methyl and ethyl alcohol.

6. An indicating solution as defined in claim 4 but characterized by said aliphatic alcohol being chosen from the class consisting of methyl and ethyl alcohol.

7. A method for the determination of the chloride ion content in an aqueous solution, comprising adding as indicators bromo phenol blue and diphenylcarbazone to a sample of the aqueous solution, the diphenylcarbazone serving as an end color determinant, and the bromo phenol blue serving both as a pH indicator and to mask premature development of end color by the diphenylcarbazone, adjusting the pH of the solution to just obtain the acid color of the bromo phenol blue, and titrating with mercuric nitrate solution until the color of the aqueous solution changes to a blue-violet.

8. A method as defined in claim 7 but further characterized by the diphenylcarbazone being about 50–98 percent and the bromo phenol blue being about 2.4–50 percent of their total weight.

9. A method as defined in claim 8 but further characterized by said diphenylcarbazone being added in solution with a lower aliphatic alcohol containing from one to six carbon atoms.

10. A method as defined in claim 9 but further characterized by said alcohol being chosen from the class consisting of methanol and ethanol.

11. A method for the determination of the chloride ion content in an aqueous solution, comprising adding as indicators bromo phenol blue and diphenylcarbazone to a sample of the aqueous solution, the diphenylcarbazone serving as an end color determinant and the bromo phenol blue serving both as a pH indicator and to mask premature development of end color by the diphenylcarbazone, adding nitric acid to the aqueous solution to obtain the acid color of the bromo phenol blue and a pH of about 3.3, and titrating with mercuric nitrate.

12. A method as defined in claim 11 but further characterized by the diphenylcarbazone being about 50-98 percent and the bromo phenol blue being about 2.4-50 percent of their total weight.

13. A method as defined in claim 12 but further characterized by said diphenylcarbazone being added in solution with a lower aliphatic alcohol containing from one to six carbon atoms.

14. A method as defined in claim 13 but further characterized by said alcohol being chosen from the class consisting of methanol and ethanol.

15. An indicator for titration procedures consisting of a solution of ingredients in proportions equivalent to 0.5 gram to 1.0 gram of diphenylcarbazone and 0.05 gram to 0.1 gram of crystalline tetrabromo phenol sulphonphthalein in 25-100 milliliters of 95% aliphatic alcohol containing from one to six carbon atoms.

16. An indicator for titration procedures consisting of a solution of ingredients in proportions equivalent to 0.5 gram to 1.0 gram of diphenylcarbazone and 0.05 gram to 0.1 gram of crystalline tetrabromo phenol sulphonphthalein in 25-100 milliliters of methyl alcohol.

17. An indicator for titration procedures consisting of a solution of ingredients in proportions equivalent to 0.5 gram to 1.0 gram of diphenylcarbazone and 0.05 gram to 0.1 gram by weight of crystalline tetrabromo phenol sulphonphthalein in 25-100 milliliters of 95% ethyl alcohol.

18. A step in the process of determining the chloride ion content of a solution which comprises adding to a measured quantity of this solution five drops of indicator formed of a mixture of diphenylcarbazone and tetrabromo phenol sulphonphthalein and an aliphatic alcohol solvent, the alcohol containing from one to six carbon atoms, adjusting the pH of the solution to obtain the acid color of the tetrabromo phenol sulphonphthalein component, and adding mercuric nitrate solution until the solution color changes.

19. A step in the process of determining the chloride ion content of a solution which comprises adding to a measured quantity of the solution five drops of indicator formed of a mixture of diphenylcarbazone and tetrabromo phenol sulphonphthalein in 10 to 1 ratio and an aliphatic alcohol solvent, the alcohol containing from one to six carbon atoms, adjusting the pH of the solution with nitric acid to obtain the yellow acid color of the tetrabromo phenol sulphonphthalein component, and adding mercuric nitrate solution in drop increments until the yellow acid solution color changes to blue-violet.

References Cited in the file of this patent

UNITED STATES PATENTS

| | | |
|---|---|---|
| 2,385,471 | Scharer | Sept. 25, 1945 |
| 2,599,697 | Conklin | June 10, 1952 |
| 2,617,715 | Haller | Nov. 11, 1952 |
| 2,643,230 | Mooradian et al. | June 23, 1953 |
| 2,663,692 | Corso et al. | Dec. 22, 1953 |